(12) United States Patent
Fujii et al.

(10) Patent No.: US 8,399,836 B2
(45) Date of Patent: Mar. 19, 2013

(54) INFRARED RAY TRANSMISSIVE OPTICAL MEMBER AND MANUFACTURING METHOD THEREOF, OPTICAL DEVICE, AND OPTICAL APPARATUS

(75) Inventors: Takashi Fujii, Kyoto-Fu (JP); Kazuyuki Hirao, Nishikyo-Ku (JP); Kanji Sakata, Shunan (JP)

(73) Assignees: Murata Manufacturing Co., Ltd., Nagaokakyo-Shi, Kyoto-fu (JP); Tokuyama Corporation, Shunan-shi, Yamaguchi (JP)

( * ) Notice: Subject to any disclaimer, the term of this patent is extended or adjusted under 35 U.S.C. 154(b) by 0 days.

(21) Appl. No.: 13/159,799

(22) Filed: Jun. 14, 2011

(65) Prior Publication Data

US 2011/0243162 A1    Oct. 6, 2011

Related U.S. Application Data

(63) Continuation of application No. PCT/JP2009/071315, filed on Dec. 22, 2009.

(30) Foreign Application Priority Data

Dec. 24, 2008    (JP) .................. 2008-328241

(51) Int. Cl.
*G01J 5/00* (2006.01)
*G02B 5/20* (2006.01)
(52) U.S. Cl. ..................... 250/338.1; 359/359
(58) Field of Classification Search ............... 250/338.1; 359/359
See application file for complete search history.

(56) References Cited

U.S. PATENT DOCUMENTS

| | | | | |
|---|---|---|---|---|
| 3,761,757 | A | * | 9/1973 | Muhlbauer et al. ........... 313/110 |
| 4,148,931 | A | * | 4/1979 | Reuschel et al. .................. 427/8 |
| 4,900,411 | A | * | 2/1990 | Poong et al. ............. 204/157.43 |
| 2003/0020887 | A1 | | 1/2003 | Hasegawa |
| 2010/0089451 | A1 | * | 4/2010 | Harimoto et al. ............. 136/261 |
| 2010/0282321 | A1 | * | 11/2010 | Fenollosa Esteve et al. . 136/261 |

FOREIGN PATENT DOCUMENTS

| | | |
|---|---|---|
| JP | 6-213725 | 8/1991 |
| JP | 4-315927 | 11/1992 |
| JP | 5-60901 | 3/1993 |
| JP | 2002-234774 | 8/2002 |
| JP | 2003-42950 | 2/2003 |
| JP | 2004-233802 | 8/2004 |

OTHER PUBLICATIONS

PCT/JP2009/071315 International Search Report dated Mar. 30, 2010.
Sigma Koki Co., Ltd. Web catalog, p. 249 "Silicon Windows for Infrared Laser", Aug. 11, 2008.

* cited by examiner

*Primary Examiner* — David Porta
*Assistant Examiner* — Mindy Vu
(74) *Attorney, Agent, or Firm* — Dickstein Shapiro LLP

(57) ABSTRACT

An optical member made of polycrystalline silicon formed from high-purity trichlorosilane as a raw material, and that absorbs and scatters an infrared ray in a wavelength region of 4 μm or less. In the optical member, a ratio A/B between a transmittance A of an infrared ray having a wavelength of 4 μm and a transmittance B of an infrared ray having a wavelength of 10 μm is 0.9 or less, and an average crystal grain size of the polycrystalline silicon is 5 μm or less. This polycrystalline silicon is produced by hydrogen reducing $SiHCl_3$ by heating a base material to 800 to 900° C. using a chemical vapor deposition method. In this way, an infrared ray transmissive optical member, a manufacturing method thereof, an optical device, an infrared detector, and an optical apparatus capable of sensing a human body with high sensitivity and accuracy are realized.

17 Claims, 4 Drawing Sheets

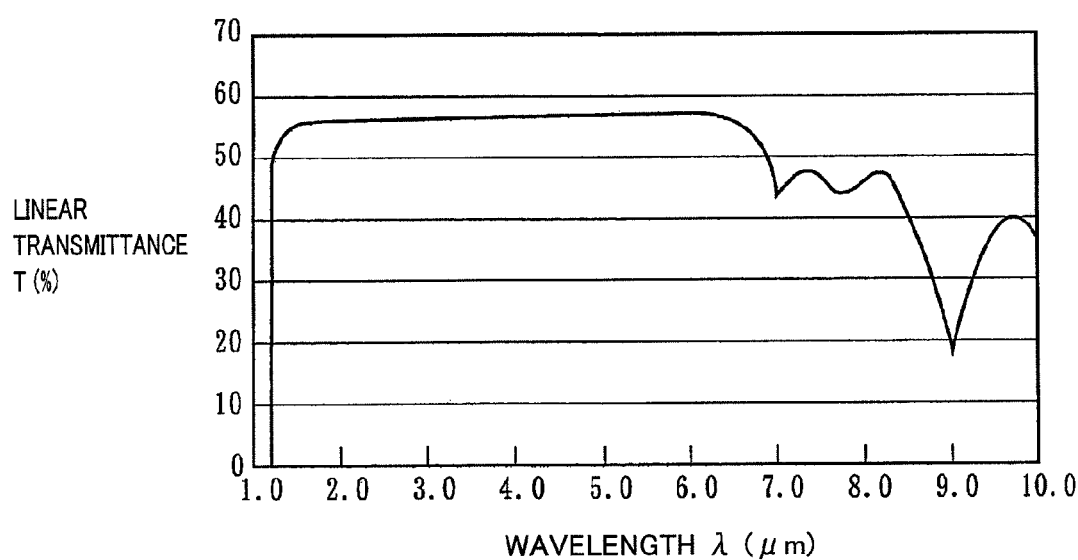
FIG. 9 - PRIOR ART

INFRARED RAY TRANSMISSIVE OPTICAL MEMBER AND MANUFACTURING METHOD THEREOF, OPTICAL DEVICE, AND OPTICAL APPARATUS

CROSS REFERENCE TO RELATED APPLICATIONS

The present application is a continuation of International Application No. PCT/JP2009/071315, filed Dec. 22, 2009, which claims priority to Japanese Patent Application No. JP2008-328241, filed Dec. 24, 2008, the entire contents of each of these applications being incorporated herein by reference in their entirety.

FIELD OF THE INVENTION

The present invention relates to an infrared ray transmissive optical member, a manufacturing method thereof, an optical device, and an optical apparatus, and more specifically, to an infrared ray transmissive optical member suited for sensing a human body, a manufacturing method thereof, an optical device such as an infrared detector that senses a human body using the infrared ray transmissive optical member, and an optical apparatus that blocks infrared rays in a specific wavelength region using the optical device.

BACKGROUND OF THE INVENTION

Silicon materials are widely used as optical lenses and materials for windows because they have excellent transmittance over a wide range from a near-infrared region to a terahertz (THz) region (wavelength: about 1.1 μm to 10 mm), excellent workability, and easy availability.

For example, in Non-patent document 1 an infrared window having a transmission spectrum as shown in FIG. 9 is described.

The infrared window described in Non-patent document 1 shows an excellent linear transmittance of about 55% in the wavelength band ranging from 1.2 to 6 μm as shown in FIG. 9, and is expected to be desirably used in this wavelength band.

On the other hand, in recent years, research and development for an infrared detector that detects an infrared ray emitted from a human body and senses the human body based on the same have been actively made.

In such a type of infrared detector, it is desired to have high infrared transmittance in a wavelength band ranging from 8 to 12 μm around 10.6 μm because the infrared wavelength corresponding to around 37° C. which is a temperature of a human body (body temperature) is about 10.6 μm.

In Patent document 1, an infrared optical device obtained by processing polycrystalline silicon having a purity of nine nines (9N:99.9999999%) or higher produced by a CVD method into a lens shape or a filter shape is proposed.

In this Patent document 1, a mixed gas of a high-purity silicon compound such as mono-silane ($SiH_4$) and hydrogen is heated to 900 to 1200° C. to cause a hydrogen reduction by a CVD method, and thereby polycrystalline silicon having a high purity of 9N is produced. Then, an infrared optical device with an anti-reflection coating, having a transmittance of 90% or higher at a wavelength of 9 μm is obtained.

Patent document 1: Japanese Patent Laying-Open No. 05-60901 (claim 1, Paragraph No. [0009], Table 1)

Non-patent document 1: SIGMA KOKI CO., LTD. WEB catalogue "infrared windows-silicon" [online], [searched on Aug. 11, 2008], INTERNET <URL:http://www.sigma-koki.com/B/Windows/WindowsSilicon/OPSI/OPSI.html>

SUMMARY OF THE INVENTION

In the infrared window of Non-patent document 1, however, as is apparent from FIG. 9, linear transmittance of an infrared ray starts decreasing in a wavelength region around 6.5 μm and decreases to 20% or less at a wavelength of 9 μm. That is, in Non-patent document 1, while high transmittance is exhibited in a wavelength region between 1.2 and 6 μm, there is a loss due to large absorption at a wavelength of around 9 μm. This is attributable to impurity defects (oxygen), and it is not suited for an infrared detector for sensing a human body because of the low linear transmittance in a wavelength region around 9 μm.

On the other hand, in the infrared optical device of Patent document 1, excellent linear transmittance can be obtained in a wavelength region around 9 μm related with sensing of a human body, however, linear transmittance approximately equal to that in a wavelength region of 9 μm is observed also in the mid-infrared and near-infrared regions of 4 μm or less. Accordingly, there is a problem that rays in the mid-infrared to near-infrared regions act as stray light to the ray emitted from a human body, and deteriorate a S/N ratio, so that a human body cannot be sensed with high sensitivity.

Among infrared rays, mid-infrared and near-infrared rays (having a wavelength of about 0.78 to 4 μm) have high ray intensities because they have shorter wavelengths than far-infrared rays of 8 to 12 μm as described above. Once transmitting through an optical device, an infrared ray in the mid-infrared and near-infrared regions can act as stray light to the ray emitted from a human body and deteriorate the S/N ratio. Therefore, it is necessary to control the linear transmittance of an infrared ray in the mid-infrared and near-infrared regions.

However, the inventors produced polycrystalline silicon in a similar manner to that of Patent document 1 using trichlorosilane, and revealed that high linear transmittance is observed not only in a wavelength region around 9 μm but also in the mid-infrared and near-infrared regions having shorter wavelengths. This may lead a deterioration in S/N ratio, and disable sensing of a human body with high sensitivity as described above.

The present invention was devised in consideration of such circumstances, and it is an object of the present invention to provide an infrared ray transmissive optical member capable of sensing a human body with high sensitivity and high accuracy, a manufacturing method thereof, an optical device using the infrared ray transmissive optical member, an infrared detector using the optical device, and an optical apparatus.

For achieving the aforementioned object, an infrared ray transmissive optical member (hereinafter, simply referred to as "transmissive optical member") of the present invention is formed of polycrystalline silicon formed from high-purity trichlorosilane as a raw material, and is characterized by absorbing and scattering an infrared ray in a wavelength region of 4 μm or less.

Here, in the present invention, "absorbing and scattering" means that a ratio between a transmittance in a wavelength region of 4 μm or less and a transmittance in a wavelength region of around 10 μm is less than 1.

Further, the transmissive optical member of the present invention is characterized in that a ratio A/B between a transmittance A of an infrared ray at a wavelength of 4 μm and a transmittance B of an infrared ray at a wavelength of 10 μm is 0.9 or less.

Further, the transmissive optical member of the present invention is characterized in that an average crystal grain size of the polycrystalline silicon is 5 μm or less.

Further, the transmissive optical member of the present invention is characterized in that the polycrystalline silicon is formed by using a chemical vapor deposition method.

Further, a manufacturing method of the transmissive optical member according to the present invention is characterized by heating a base material accommodated in a reaction vessel to a temperature of 800 to 900° C., supplying the reaction vessel with a source gas containing at least high-purity trichlorosilane and hydrogen to reduce the trichlorosilane, and letting polycrystalline silicon deposit on the base material.

Further, an optical device of the present invention is characterized by having a principal part having the aforementioned transmissive optical member.

Further, the optical device of the present invention is characterized by being an infrared detector.

Further, an optical apparatus of the present invention has first and second semiconductor lasers that emit laser light on the same optical axis, a nonlinear optical crystal disposed on the optical axis, into which the laser light enters, and filtering means for filtering a ray of a specific wavelength region of the laser light that exits from the nonlinear optical crystal, and is characterized in that the filtering means is formed of the aforementioned optical device.

According to the transmissive optical member of the present invention, since it is formed of polycrystalline silicon formed from high-purity trichlorosilane as a raw material, and absorbs and scatters an infrared ray in a wavelength region of 4 μm or less, an infrared ray in the mid-infrared and near-infrared regions is difficult to transmit, and it becomes possible to sense a human body with a high S/N ratio. Additionally, it can be obtained at a lower cost in comparison with monocrystalline silicon because it is formed of polycrystalline silicon.

Further, since a ratio A/B between a transmittance A of an infrared ray having a wavelength of 4 μm and a transmittance B of an infrared ray having a wavelength of 10 μm is 0.9 or less, transmittance for an infrared ray at 10 μm or in a wavelength region around the same (hereinafter, simply referred to as "around 10 μm") is high, and transmittance of an infrared ray in the mid-infrared and near-infrared regions is low. Therefore, it is possible to prevent an infrared ray in the mid-infrared and near-infrared regions from acting as stray light to an infrared ray in a wavelength region around 10 μm, and to sense a human body with a high S/N ratio.

Further, since an average crystal grain size of the polycrystalline silicon is 5 μm or less, an average crystal grain size is very small, and transmittance of an infrared ray in a wavelength region of 4 μm or less can be controlled.

Further, since the polycrystalline silicon is formed by using a chemical vapor deposition method, it is possible to prevent impurities from entering as is the case with a CZ method (Czochralski method) or a FZ method (Floating method), and to readily obtain polycrystalline silicon having a high purity of 10N to 11N.

Further, according to a manufacturing method of a transmissive optical member of the present invention, since a base material accommodated in a reaction vessel is heated to a temperature of 800 to 900° C., the reaction vessel is supplied with a source gas containing at least high-purity trichlorosilane and hydrogen to reduce the trichlorosilane, and polycrystalline silicon is deposited on the base material, it is possible to obtain a transmissive optical material having a desired transmission spectrum at a low cost without causing bulking of crystal grains.

Further, according to the optical device of the present invention, since a principal part has the aforementioned transmissive optical member, it is possible to obtain an optical device allowing transmission of an infrared ray in a wavelength region around 10 μm while controlling transmittance of an infrared ray in a wavelength region of 4 μm or less.

Further, since the optical device of the present invention is an infrared detector, it is possible to detect a human body with high sensitivity.

Further, since the optical apparatus according to the present invention has first and second semiconductor lasers that emit laser light on the same optical axis, a nonlinear optical crystal disposed on the optical axis, into which the laser light enters, and filtering means for filtering a ray of a specific wavelength region of the laser light that exits from the nonlinear optical crystal, and the filtering means is formed of the aforementioned optical device, only a difference frequency between oscillatory frequencies of the first and the second semiconductor lasers can be taken out with high efficiency by filtering only excitation frequencies of the first and the second semiconductor lasers.

BRIEF DESCRIPTION OF THE DRAWINGS

FIG. 9 is a view showing a transmission spectrum of an infrared window described in Non-patent document 1.

DETAILED DESCRIPTION OF THE INVENTION

Next, embodiments of the present invention will be described in detail.

A transmissive optical member according to the present invention is formed of polycrystalline silicon obtained from trichlorosilane ($SiHCl_3$) having a high purity of 10N to 11N, and is configured to absorb and scatter an infrared ray in a wavelength region of 4 μm or less. Then, as a result, it is possible to obtain a transmissive optical material suited for sensing of a human body.

A body temperature of a human is around 37° C., and an infrared wavelength corresponding to this is around 10.6 μm. Therefore, it is necessary that transmittance of an infrared ray is high in a wavelength region ranging from 8 to 12 μm centered at 10.6 μm for sensing presence of a human body by an infrared ray emitted from the human body.

On the other hand, the mid-infrared region (wavelength: 2 to 4 μm) and the near-infrared region (wavelength: 0.78 to 2 μm) are shorter wavelengths than the aforementioned wavelength region of 8 to 12 μm, and intensity of the infrared ray is higher in these regions. Therefore, when infrared transmittance is large in the mid-infrared and near-infrared regions having a wavelength of 4 μm or less, an infrared ray in these mid-infrared and near-infrared regions may act as stray light to an infrared ray emitted from a human body, to lead a deterioration in S/N ratio. This may disable a human body to be sensed with high accuracy, and reliability for sensing of a human body may be impaired.

In light of this, the transmissive optical member of the present invention is so configured that an infrared ray in a wavelength region of 4 μm or less is absorbed and scatted. That is, the aforementioned transmissive optical member is so configured that a ratio between a transmittance in the wavelength region of 4 μm or less and a transmittance in the wavelength region around 10 μm is less than 1.

Figure 1:
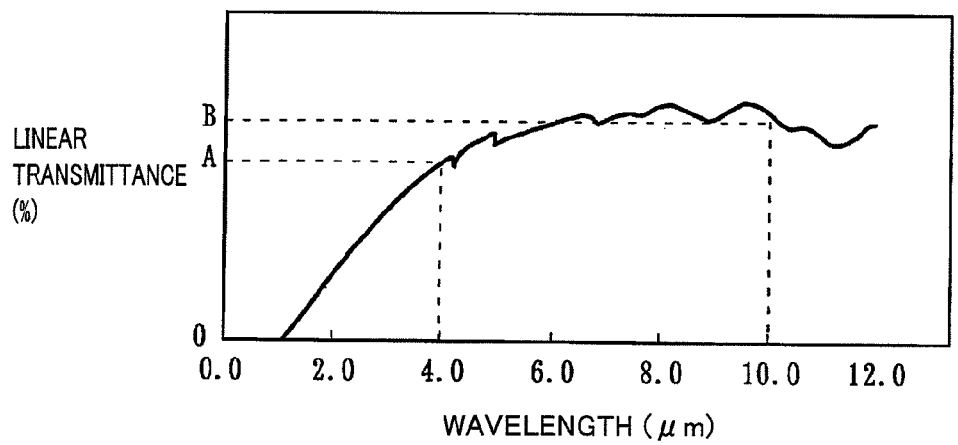
FIG. 1 is a view showing one example of a transmission spectrum of a transmissive optical member according to the present invention.

FIG. 1 is a view showing one example of a transmission spectrum of the aforementioned transmissive optical member. The horizontal axis represents a wavelength (μm), and the vertical axis represents a linear transmittance (%) of infrared ray.

As shown in FIG. 1, in the aforementioned transmissive optical member, the transmittance in a wavelength region of 8 to 12 μm around 10 μm is high, and the transmittance decreases as the wavelength decreases. In addition, in the present embodiment, it is so configured that a ratio A/B between a transmittance A of an infrared ray having a wavelength of 4 μm and a transmittance B of an infrared ray having a wavelength of 10 μm is 0.9 or less.

Thus, by making the ratio A/B 0.9 or less, it is possible to prevent an infrared ray in a wavelength region of 4 μm or less from acting as stray light to an infrared ray of around 10 μm, for example, in a wavelength region of 8 to 12 μm as much as possible. Then, as a result, it is possible to obtain an excellent S/N ratio and to sense a human body with high accuracy.

As the average crystal grain size of polycrystalline silicon increases, the transmission spectrum becomes flat over a wide wavelength band from the mid-infrared region to the far-infrared region, so that it may become difficult to sense a human body with high accuracy because the infrared ray having a wavelength of 4 μm or less acts as stray light. Therefore, it is preferred that the average crystal grain size of polycrystalline silicon is as small as possible, and is concretely 5 μm or less.

The aforementioned transmissive optical member can be readily manufactured by a chemical vapor deposition method (CVD method) using SiHCl₃ as a raw material.

Figure 2:
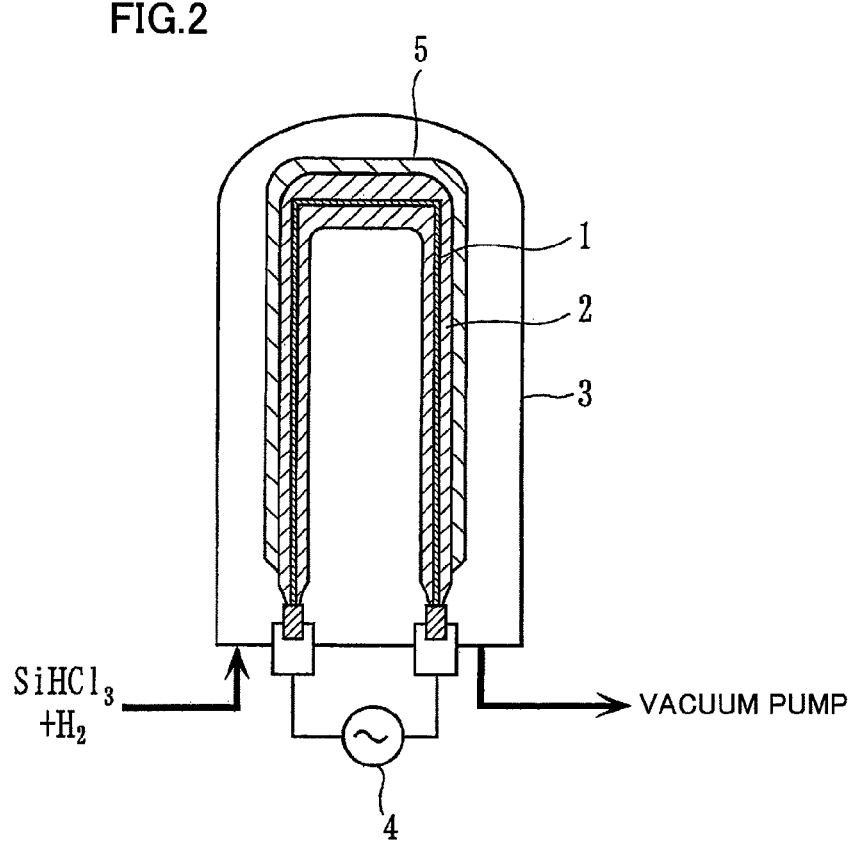
FIG. 2 is an internal structural view showing one example of a CVD apparatus used for manufacturing of a transmissive optical member according to the present invention.

FIG. 2 is an internal structural view showing one embodiment of a CVD apparatus used for manufacturing a transmissive optical member.

That is, in the CVD apparatus, a rod 2 with a predetermined diameter formed of high-purity polycrystalline silicon, having a heater 1 embedded therein is mounted inside a reaction vessel 3, and a heating power source 4 is connected to heater 1.

The interior of reaction vessel 3 is heated by bringing the interior of reaction vessel 3 into a reduced pressure state by suction with a vacuum pump, and turning on heating power source 4 to raise the temperature of heater 1 to 800 to 900° C.

Here, the heater setting temperature (rod temperature) is set at 800 to 900° C. because if the heater setting temperature exceeds 900° C., an average crystal grain size of polycrystalline silicon formed on rod 2 becomes bulky, and the transmission spectrum is flat over a wide wavelength band from the mid-infrared region to the far-infrared region, so that an infrared ray having a wavelength of 4 μm or less can transmit without being absorbed and scattered.

Currently, polycrystalline silicon is widely used as a material for a solar battery and the like. However, for ensuring a film forming rate from the view point of productivity, the temperature inside the reaction vessel is conventionally set to a high temperature exceeding 1000° C., and thereby a film of polycrystalline silicon is formed on the rod.

However, when one attempts to use the aforementioned polycrystalline silicon obtained at high temperature as an infrared filter, the infrared transmission spectrum is flat over a wide wavelength band from the mid-infrared and near-infrared regions to the far-infrared region, so that an infrared ray in the mid-infrared and near-infrared regions of 4 μm or less acts as stray light to the far-infrared region to lead a reduction in S/N.

The result of the research made by the present inventors revealed that by decreasing the heater setting temperature 900° C. or less and letting polycrystalline silicon precipitate on the rod, the film formation rate decreases, but the average crystal grain size is micro-sized to 5 μm or less, and an infrared ray having a wavelength region of 4 μm or less is absorbed and scattered without being transmitted.

In other words, for realizing a transmissive optical member suited for sensing of a human body, it is necessary to transmit an infrared ray in a wavelength region around 10 μm, for example, from 8 to 12 μm, and to scatter and absorb mid-infrared and near-infrared regions which are wavelength regions of 4 μm or less. For achieving this, it is preferred to micro-size the average crystal grain size to 5 μm or less, and for this it is necessary to set the heater setting temperature to 900° C. or less. However, when the heater setting temperature is such a low temperature below 800° C., the film formation rate extremely decreases. Therefore, taking productivity into account, it is desired to set a lower limit of the heater setting temperature at 800° C.

In the present embodiment, the heater setting temperature is set at 800 to 900° C.

Next, a mixed gas composed of high-purity SiHCl₃ and H₂ is introduced into reaction vessel 3 having a temperature set as described above. As a result, SiHCl₃ is reduced with hydrogen as shown by Chemical reaction formula (1), and polycrystalline silicon (Si) is generated.

$$SiHCl_3 + H_2 \rightarrow Si + 3HCl \tag{1}$$

That is, polycrystalline silicon 5 generated according to Chemical reaction formula (1) deposits on rod 2, and as a result, a transmissive optical material formed of polycrystalline silicon having high purity ranging from 10N (ten nines) to 11N (eleven nines) can be readily obtained at a low cost.

Conventionally, as an infrared ray transmissive optical member, monocrystalline silicon produced by a CZ method (Czochralski method) or a FZ method (floating method) has been widely used.

However, monocrystalline silicon is more expensive than polycrystalline silicon because it is usually produced by using polycrystalline silicon as a raw material. Besides, in the case of a CZ method, since polycrystalline silicon is subjected to melt-heating in a quartz crucible, oxygen and metal impurities are likely to enter, and a high-purity transmissive optical member is difficult to be obtained. In the case of a FZ method, since polycrystalline silicon is monocrystallized by high-frequency heating in a high vacuum or in an invert gas, high purity is more likely to be achieved compared to the CZ method, however, it is impossible to perfectly avoid entrance of impurities, and thus it is difficult to stabilize the transmission spectrum in a far-infrared region.

In contrast to this, in the transmissive optical member of the present invention, since polycrystalline silicon having a high purity of 10N to 11N is obtained by a CVD method, it is possible to obtain a transmissive optical member having a stable and desired transmission spectrum. Besides, since a hydrogen reduction is conducted at a temperature of 800 to 900° C., it is possible to control the average crystal grain size of polycrystalline silicon to 5 µm or less, and to prevent the crystal grains from becoming bulky. As a result, it is possible to allow an infrared ray in a wavelength region of 4 µm or less to be effectively absorbed and scattered, and thus it is possible to allow only an infrared ray in a wavelength region around 10 µm, for example 8 to 12 µm to be transmitted efficiently. Further, this polycrystalline silicon can be used for growth of monocrystalline silicon used for a production of a semiconductor device or the like, and by using such polycrystalline silicon in a transmissive optical member, a low cost production is realized.

The aforementioned high-purity $SiHCl_3$ can be produced in a well-known method as will be described below.

First, as shown in Chemical reaction formula (2), silica stone ($SiO_2$) is caused to react with carbon (C) in a carbon electrode arc furnace, and then oxygen is removed from the silica stone, to obtain a metal-grade Si having a purity of about 98%.

$$SiO_2 + 2C \rightarrow Si + 2CO \quad (2)$$

Next, as shown in Chemical reaction formula (3), metal-grade Si is caused to react with HCl. Metal impurities contained in metal-grade Si are removed in the forms of chlorides such as $BCl_3$ and $FeCl_3$, and as a result, high-purity $SiHCl_3$ can be obtained.

$$Si + 3HCl \rightarrow SiHCl_3 + H_2 \quad (3)$$

Since $SiHCl_3$ has a boiling point of 31.8° C., it is possible to improve the purity by repeating distillation purifications, and thus to readily obtain $SiHCl_3$ having a high purity of 11N.

Next, an optical device using the aforementioned transmissive optical material will be described.

Figure 3:
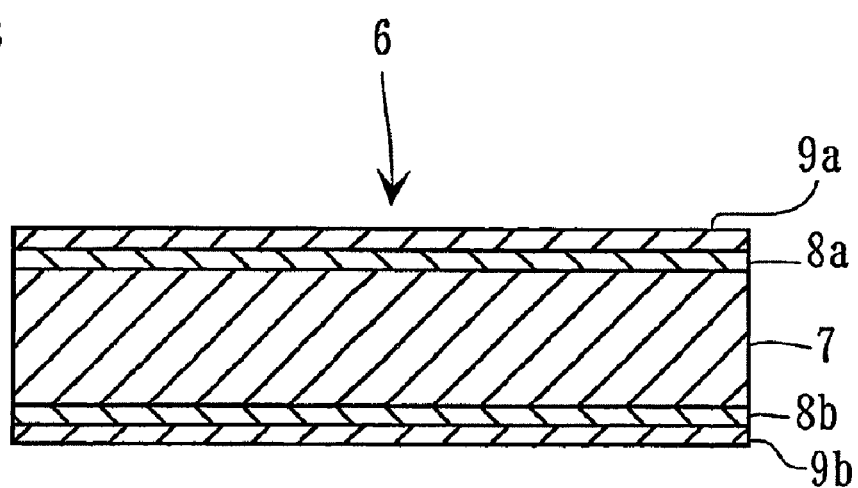
FIG. 3 is a section view schematically showing an infrared filter using a transmissive optical member of the present invention.

FIG. 3 is a section view schematically showing an infrared filter as one embodiment of the optical device according to the present invention.

An infrared filter 6 includes a filter element 7 formed of the aforementioned transmissive optical member, first anti-reflection coatings 8a, 8b made of Ge formed on an upper face and a lower face of infrared filter 6, and second anti-reflection coatings 9a, 9b made of ZnS formed on an upper face and a lower face of first anti-reflection coatings 8a, 8b.

Figure 4:
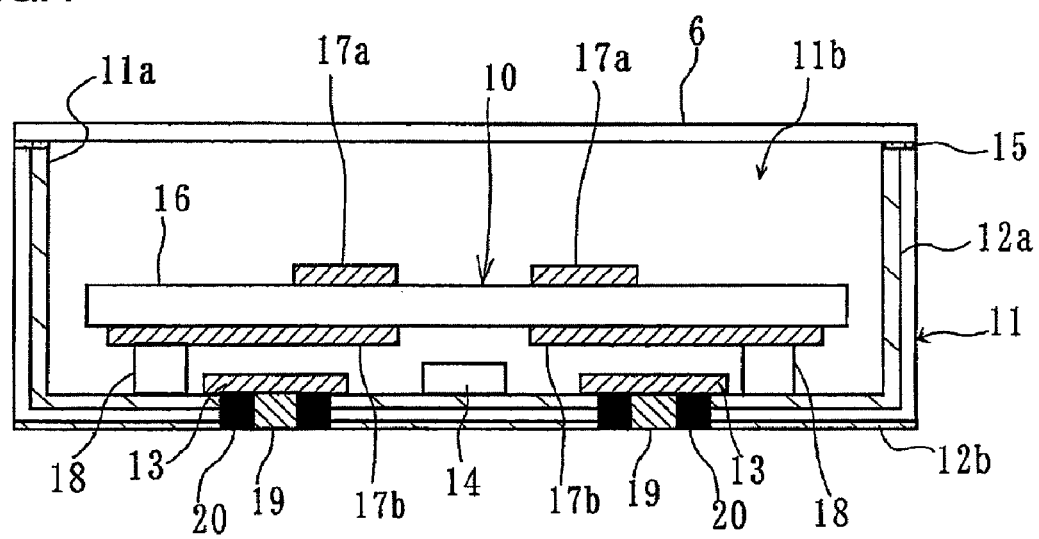
FIG. 4 is a section view showing one embodiment of an infrared detector as an optical device according to the present invention.

FIG. 4 is a section view of an infrared detector having infrared filter 6.

In this infrared detector, infrared filter 6 is provided on the top face of a package 11 accommodating a pyroelectric element 10.

Package 11 has a box shape having a top face formed with an opening 11a, and a bottom face formed with a pore, and is made of a metal material such as, for example, 42Ni, phosphor bronze, brass, Cu—Ni—Zn alloy and iron.

On an inner face and an outer bottom face of package 11, insulating members 12a, 12b formed from glass or LCP (liquid crystal polyester) resin or the like are pasted. Further, in a predetermined position in an inner bottom face of insulating member 12a, a wiring pattern 13 and a FET 14 are disposed, which are electrically connected with an electrode and wiring (not shown), to match with a surface mounting type.

Infrared filter 6 is adhered to package 11 via a conductive adhesive 15 to cover the entire area of opening 11a of package 11, and whereby infrared filter 6 and package 11 are electrically connected. That is, infrared filter 6 has a function of making pyroelectric element 10 receive an infrared ray having a wavelength of 8 to 12 µm with high sensitivity, and a function as a rid that seals opening 11a of package 11. In the present embodiment, infrared filter 6 is not partially shield and hence the entire face allows transmission of an infrared ray. Therefore, it is possible to make an infrared light-receiving area larger, and to obtain an infrared detector realizing high detection accuracy.

In the present embodiment, pyroelectric element 10 is formed by a so-called dual type in which a principal part is formed of PZT or the like. Two upper electrodes (light-receiving electrodes) 17a, 17a arranged on a surface of a pyroelectric body 16 are connected in series to have reverse polarity, and they are so configured that external noise associated with external temperature variation or the like is cancelled when an infrared ray simultaneously enters upper electrodes 17a, 17a.

Further, in an appropriated site in the inner bottom face of insulating member 12a, a supporting member 18 is disposed, and pyroelectric element 10 is placed on supporting member 18. That is, pyroelectric element 10 is supported by supporting member 18 via lower electrodes 17b, 17b.

Further, a lower face of wiring pattern 13 is provided with an external connection terminal 19, and an insulator 20 of glass or the like is interposed between external connection terminal 19 and package 11 so that package 11 and external connection terminal 19 are electrically insulated from each other. As a result, pyroelectric element 10 is configured to be electrically connected to an external device via wiring pattern 13 or external connection terminal 19.

In the infrared detector arranged as described above, when an infrared ray corresponding to a body temperature emitted from a human body enters upper electrodes 17a via infrared filter 6, pyroelectric element 10 outputs an pyroelectric current corresponding to a magnitude, the magnitude varying depending on the quantity of infrared ray, and a voltage signal corresponding to the pyroelectric current is inputted to a gate terminal of FET 14. Then a bias voltage that is divided by a resistance value between a drain terminal and a source terminal of FET 14, and a resistance value of a source resistance, and a voltage signal inputted into the gate terminal are superposed, and a voltage signals is outputted from a source terminal. As a result, the human body can be sensed.

Figure 5:
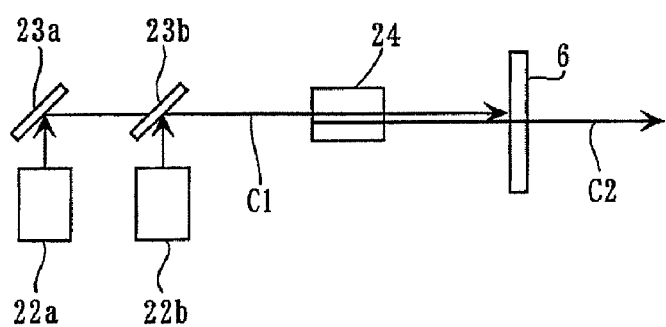
FIG. 5 is an apparatus arrangement view showing an outline of one embodiment of an optical apparatus according to the present invention.

FIG. 5 is a schematic view showing one embodiment of an optical apparatus according to the present invention.

That is, the optical apparatus includes first and second semiconductor lasers 22a, 22b having the same excitation frequency (for example, wavelength: 1.55 µm) disposed at a predetermined interval, first and second reflective mirrors 23a, 23 that guide laser light emitted from first and second semiconductor lasers 22a, 22b onto an optical axis C1, a nonlinear optical crystal 24 such as $LiNbO_3$ disposed on optical axis C1 into which laser light enters, and infrared filter 6 of the present invention that filters wavelength (1.55 µm) of excitation light from first and second semiconductor lasers 22a, 23b.

In the optical apparatus arranged as described above, when temperatures of first semiconductor laser 22a and second semiconductor laser 22b are varied very slightly by arbitrary means, difference arises in oscillatory frequency between first semiconductor laser 22a and second semiconductor laser 22b. For example, describing oscillatory frequency of first semiconductor laser 22a as ω1, and oscillatory frequency of second semiconductor laser 22b as ω2, a difference arises in respective oscillatory frequencies of first semiconductor laser 22a and second semiconductor laser 22b, and there arises a difference frequency Δω(=ω1−ω2). When laser light enters nonlinear optical crystal 24 in this condition, laser light (basic laser light) attributed to excitation frequency and difference frequency light attributed to difference frequency Δωexit from nonlinear optical crystal 24 onto the same optical axes C1, C2. And since infrared filter 6 is able to filter an infrared ray (excitation light) in a near-infrared region having a wavelength of 1.55 μm, it is possible to emit only difference frequency Δω of a far-infrared ray having a large wavelength on optical axis C2, and to easily take out only difference frequency light.

The present invention is not limited to the foregoing embodiments. In the foregoing embodiments, while infrared filter 6 in the shape of a flat plate is exemplified, it may be of a lens shape, and in this case, various optical parts having both a filter function and a lens faction can be realized.

Next, examples of the present invention will be concretely described.

EXAMPLES

[Production of Sample]

Example 1

Polycrystalline silicon was produced using the CVD apparatus (FIG. 2) described in the item of [Best mode for carrying out the invention].

To be more specific, a rod made of high-purity polycrystalline silicon having a diameter of 5 to 6 mm into which a heater is embedded was mounted inside a reaction vessel and brought into a reduced pressure, while a heater setting temperature was raised to 850° C. Then a raw material gas composed of high-purity $SiHCl_3$ and $H_2$ was introduced into the reaction vessel to reduce $SiHCl_3$ and to allow precipitation and deposition of Si on the rod, whereby a sample (polycrystalline silicon) of Example 1 was produced.

Purity of the produced polycrystalline silicon was measured, and it was 11N (99.999999999%).

Comparative Example 1

A sample (polycrystalline silicon) of Comparative example 1 was produced in a similar manner to [Example 1] except that the heater setting temperature was 1050° C. Purity of Comparative example 1 was 11N.

Comparative Example 2

Monocrystalline silicon was produced by a FZ method using polycrystalline silicon of Comparative example 1.

Specifically, polycrystalline silicon of Comparative example 1 was placed in a vessel, and high-frequency heating was conducted at an applying frequency of 3 MHz, to melt the polycrystalline silicon, and then using seed crystal (monocrystalline silicon) re-coagulation was caused in the same orientation as that of the seed crystal, whereby a sample (monocrystalline silicon) of Comparative example 2 was produced. Purity was 11N.

[Evaluation of Sample]

Each sample of Example 1, and Comparative examples 1, 2 was cut out in a parallel manner, and both sides were optically polished, and transmission spectrum of an infrared ray was measured by a high-speed Fourier infrared spectrometer (FT-IR). Specifically, first, a blank value of each wavelength in the absence of a sample was measured, and then a sample was mounted in the measuring apparatus and similar measurement was conducted, and linear transmittance was determined from ratios in each wavelength to obtain a transmission spectrum.

Figure 6:
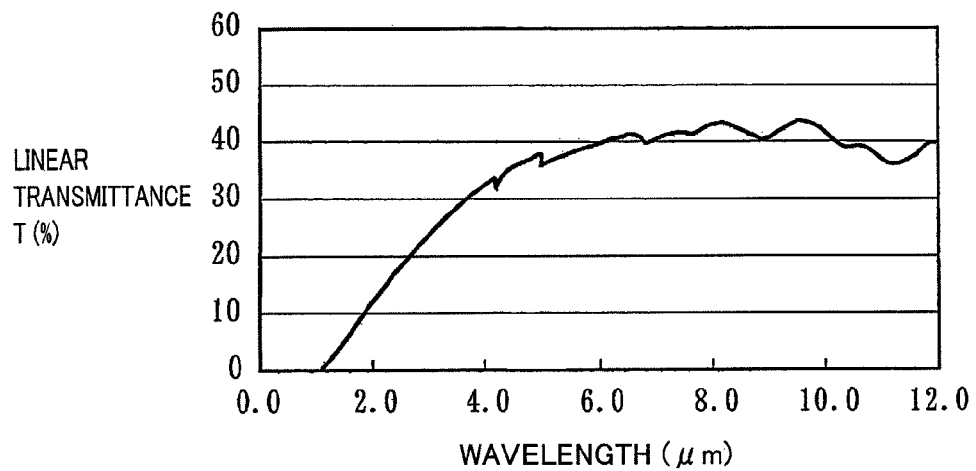
FIG. 6 is a view showing a transmission spectrum of a sample of Example 1.
Figure 7:
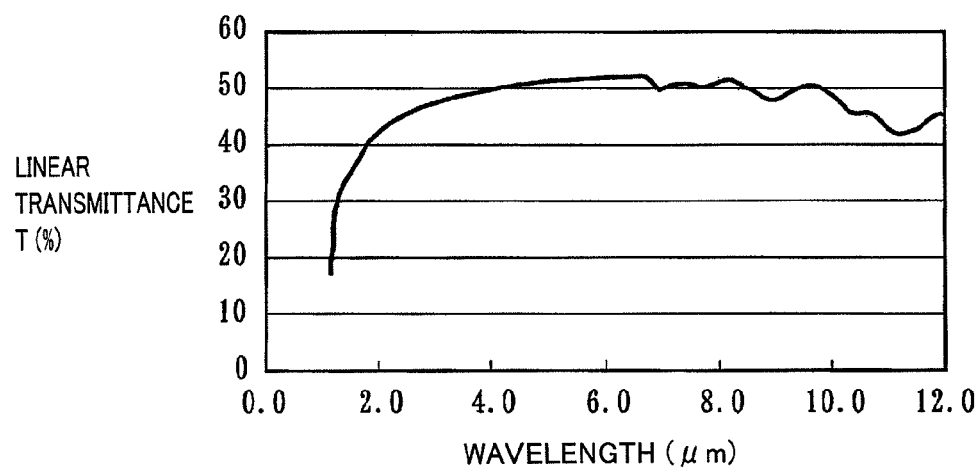
FIG. 7 is a view showing a transmission spectrum of a sample of Comparative example 1.
Figure 8:
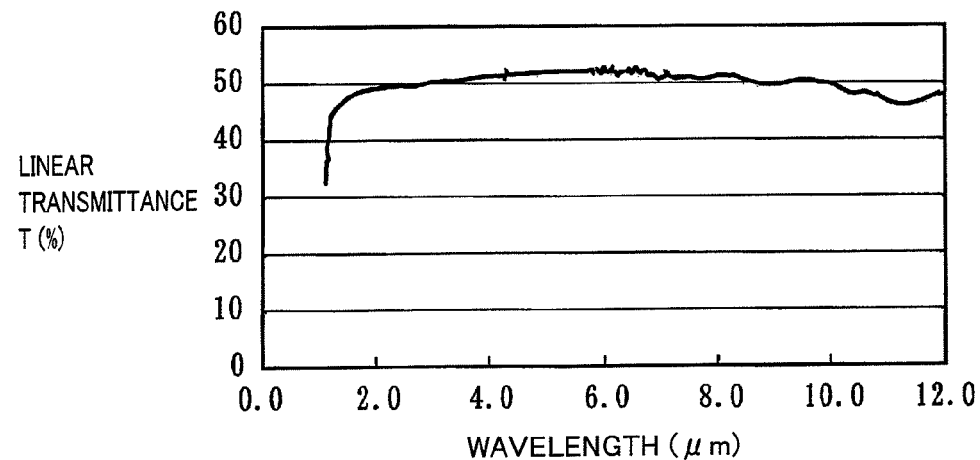
FIG. 8 is a view showing a transmission spectrum of a sample of Comparative example 2.

FIG. 6 shows a transmission spectrum of Example 1, FIG. 7 shows a transmission spectrum of Comparative example 1, and FIG. 8 shows a transmission spectrum of Comparative example 2. The horizontal axis represents wavelength (μm) and the vertical axis represents linear transmittance (%).

Table 1 shows ratios of linear transmittance in a wavelength of 4 μm, a wavelength of 3 μm and a wavelength of 2 μm, relative to a linear transmittance of an infrared ray in a wavelength of 10 μm as 1.

Each linear transmittance was obtained by averaging measurements of ten times, and each ratio was determined from average values of these linear transmittances.

Further, as for Example 1 and Comparative example 1, an average crystal grain size of crystal grains was measured. To be more specific, each sample was mirror polished and measured by an electron microscope/backscattered electron diffraction pattern (FE-SEM/EBSP) system, and an average grain size of crystal grains was calculated using EBSP analysis software (available from TSL solutions, OIM Analysis Ver.4.6).

Table 2 shows average crystal grain sizes of samples of Example 1 and Comparative example 1.

TABLE 1

| Sample No. | Wavelength | | | |
| --- | --- | --- | --- | --- |
| | 10 μm | 4 μm | 3 μm | 2 μm |
| Example 1 | 1 | 0.81 | 0.69 | 0.45 |
| Comparative example 1 | 1 | 1.03 | 0.98 | 0.88 |
| Comparative example 2 | 1 | 1.05 | 1.03 | 1.01 |

TABLE 2

| Sample No. | Average grain size of crystal grain (μm) |
| --- | --- |
| Example 1 | 1 |
| Comparative example 1 | 10 |

As is apparent from FIG. 7, the sample of Comparative example 1 exhibits a linear transmittance that is approximately equal to that of the wavelength region of 8 to 12 μm of wavelength even in the mid-infrared and near-infrared regions of 2 to 6 μm of wavelength. As shown in Table 1, linear transmittances of wavelength 4 μm, wavelength 3 μm, and wavelength or 2 μm were 1.03, 0.98 and 0.88, respectively, by ratio with respect to the linear transmittance of wavelength of 10 μm. Therefore, this sample is not suited as a transmissive optical material for sensing a human body because an infrared ray in the mid-infrared region acts as stray light to deteriorate the S/N ratio and lead a decrease in accuracy of sensing a human body.

This is attributed to the fact that the sample of Comparative example 1 becomes bulky as evidenced from an average crystal grain size of 10 μm as shown in Table 2 because polycrystalline silicon is produced at such a high temperature of 1050° C.

As is apparent from FIG. 8, the sample of Comparative example 2 also exhibits a flat transmission spectrum over a wide wavelength region, and exhibits a linear transmittance approximately equal to that of the wavelength region of wavelengths of 8 to 12 μm, also in the mid-infrared and near-infrared regions of wavelengths of 8 to 12, substantially likewise the case of Comparative example 1. Also as shown in Table 1, linear transmittances of wavelength 4 μm, wavelength 3 μm, and wavelength 2 μm showed ratios of 1.05, 1.03 and 1.01, respectively, with respect to the linear transmittance of wavelength 10 μm. Therefore, almost likewise Comparative example 1, this sample is not suited as a transmissive optical material for sensing a human body because the mid-infrared rays act as stray light to deteriorate the S/N ratio, and lead a decrease in accuracy of sensing a human body.

This is attributable to the fact that although the sample of Comparative example 2 has relatively few oxygen defect, and has excellent infrared transmissivity in a wavelength region of 8 to 12 μm around 10 μm because it is produced by a FZ method, a transmittance in the mid-infrared region increases because scattering does not occur in a grain boundary part.

On the other hand, in Example 1, since high-purity polycrystalline silicon is obtained by setting the heater setting temperature at 850° C., it is possible to control the average crystal grain size to 1 μm which is 5 μm or less as shown in Table 2, and to prevent the crystal grains from becoming bulky.

As a result, as shown in FIG. 6, linear transmittance of the wavelength region of wavelength of 4 μm or less decreases in comparison with the linear transmittance in a wavelength region of 8 to 12 μm. And as shown in Table 1, it was revealed that 81% of an infrared ray having a wavelength of 4 μm transmits, only 69% of an infrared ray having a wavelength of 3 μm transmits, and only 45% of an infrared ray having a wavelength of 2 μm transmits in comparison with the infrared ray having a wavelength of 10 μm.

That is, it was confirmed that the sample of Example 1 shows excellent linear transmittance in a wavelength region of 8 to 12 μm around 10 μm, and is able to effectively absorb and scatter an infrared ray having a wavelength of 4 μm or less.

DESCRIPTION OF THE REFERENCE NUMBERS

| | |
|---|---|
| 2 | rod (base material) |
| 3 | reaction vessel |
| 5 | polycrystalline silicon |
| 6 | infrared filter |
| 22a | first semiconductor laser |
| 22b | second semiconductor laser |
| 24 | nonlinear optical crystal |

The invention claimed is:

1. An infrared ray transmissive optical member comprising a polycrystalline silicon formed from trichlorosilane as a raw material, the infrared ray transmissive optical member configured to absorb and scatter an infrared ray in a wavelength region of 4 μm or less whereby a ratio between a first transmittance of the infrared ray in the wavelength region of 4 μm or less and a second transmittance of an infrared ray in a wavelength region around 10 μm is less than 1.

2. The infrared ray transmissive optical member according to claim 1, wherein a ratio A/B between a first transmittance A of a first infrared ray having a wavelength of 4 μm and a second transmittance B of a second infrared ray having a wavelength of 10 μm is 0.9 or less.

3. The infrared ray transmissive optical member according to claim 2, wherein the trichlorosilane has a purity of 10N to 11N.

4. The infrared ray transmissive optical member according to claim 3, wherein an average crystal grain size of said polycrystalline silicon is 5 μm or less.

5. An optical device having a principal part comprising the infrared ray transmissive optical member according to claim 2.

6. The optical device according to claim 5, wherein the optical device is an infrared detector.

7. An optical apparatus comprising:
   first and second semiconductor lasers that emit laser light on a same optical axis;
   a nonlinear optical crystal disposed on said optical axis, and into which said laser light enters; and
   a filter element that filters a ray in a specific wavelength region of exiting laser light from said nonlinear optical crystal,
   wherein said filter element includes the optical device according to claim 5.

8. The infrared ray transmissive optical member according to claim 1, wherein the trichlorosilane has a purity of 10N to 11N.

9. The infrared ray transmissive optical member according to claim 8, wherein an average crystal grain size of said polycrystalline silicon is 5 μm or less.

10. The infrared ray transmissive optical member according to claim 1, wherein an average crystal grain size of said polycrystalline silicon is 5 μm or less.

11. The infrared ray transmissive optical member according to claim 1, wherein said polycrystalline silicon is a chemical vapor deposited polycrystalline silicon.

12. An optical device having a principal part comprising the infrared ray transmissive optical member according to claim 1.

13. The optical device according to claim 12, wherein the optical device is an infrared detector.

14. An optical apparatus comprising:
   first and second semiconductor lasers that emit laser light on a same optical axis;
   a nonlinear optical crystal disposed on said optical axis, and into which said laser light enters; and
   a filter element that filters a ray in a specific wavelength region of exiting laser light from said nonlinear optical crystal,
   wherein said filter element includes the optical device according to claim 12.

15. An optical device having a principal part comprising the infrared ray transmissive optical member according to claim 1.

16. The optical device according to claim 15, wherein the optical device is an infrared detector.

17. An optical apparatus comprising:
   first and second semiconductor lasers that emit laser light on a same optical axis;
   a nonlinear optical crystal disposed on said optical axis, and into which said laser light enters; and
   a filter element that filters a ray in a specific wavelength region of exiting laser light from said nonlinear optical crystal,
   wherein said filter element includes the optical device according to claim 15.

* * * * *